United States Patent

Huang

[11] Patent Number: 6,149,753
[45] Date of Patent: Nov. 21, 2000

[54] FILMLESS STICKER AND THE PREPARATION THEREOF

[75] Inventor: Chao-Tsai Huang, Changhua Hsien, Taiwan

[73] Assignee: Chao-Yi Hung, Taichung, Taiwan

[21] Appl. No.: 09/137,302

[22] Filed: Aug. 21, 1998

[51] Int. Cl.[7] .......................... B44C 1/165; B32B 31/14; B41M 3/12; B05D 1/38

[52] U.S. Cl. .......................... 156/230; 156/239; 156/240; 156/247; 156/277; 156/289; 427/146; 427/147; 427/264; 428/202; 428/914

[58] Field of Search .................................. 156/230, 233, 156/234, 236, 239, 240, 241, 247, 277, 289, 155; 427/146, 147, 148, 149, 264; 428/200, 202, 209, 207, 913, 914

[56] References Cited

U.S. PATENT DOCUMENTS

| | | | |
|---|---|---|---|
| 3,089,800 | 5/1963 | Colfer et al. | 428/41.1 |
| 4,242,378 | 12/1980 | Arai | 427/264 |
| 4,477,312 | 10/1984 | Czichy | 156/656 |

Primary Examiner—James Sells
Assistant Examiner—J. A. Lorengo
Attorney, Agent, or Firm—Bacon & Thomas

[57] ABSTRACT

Disclosed is a filmless sticker for transfer-printing an ink in a pattern and/or characters thereon to a receiver. Said filmless sticker is composed of a releasing paper having a binder on one surface thereof, a soluble film disposed on said binder, and a layer of ink in a pattern and/or characters printed onto said soluble film. The process for preparing said filmless sticker is also disclosed.

2 Claims, 5 Drawing Sheets

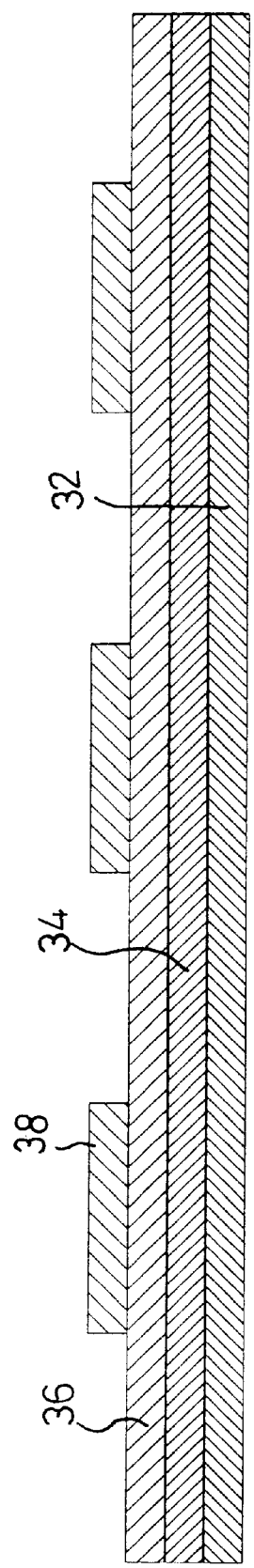
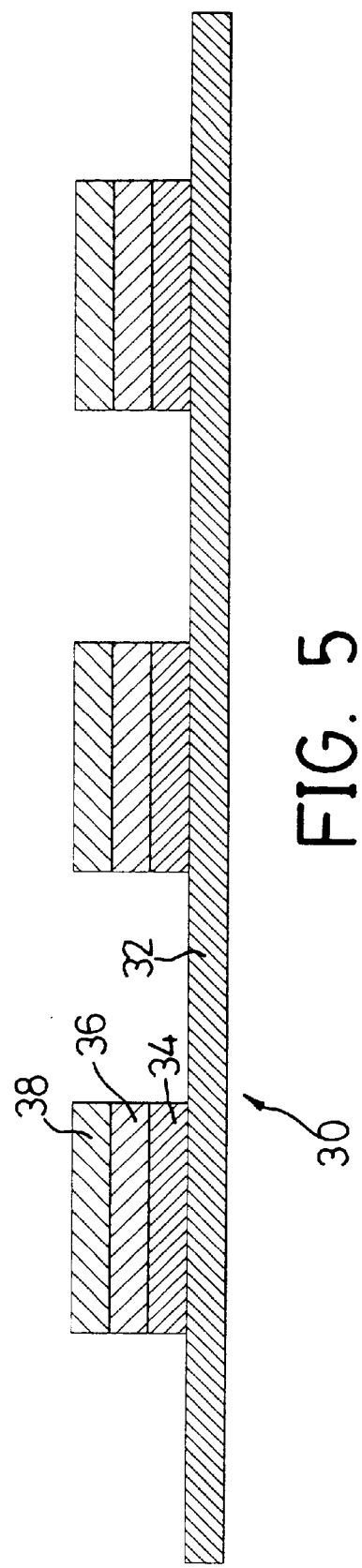
FIG. 4
FIG. 5

FILMLESS STICKER AND THE PREPARATION THEREOF

BACKGROUND OF THE INVENTION

1. Field of the Invention

The present invention relates to a filmless sticker for transfer-printing an ink in a pattern and/or characters thereon to a receiver, as well as to a process for preparing the filmless sticker which is easily achieved and improves the integrated appearance of the sticker with low cost but high efficiency.

2. Description of the Prior Arts

Transfer-printing is a well known printing process, in which ink is transferred from a transfer-printing sheet or sticker to a receiving article, flat or not, by pressure and/or heat to form a pattern and/or characters on the receiver, and then the transfer-printing sheet is separated from the receiver after transfer-printing in direct contact with each other. Similar transfer-printing sheets disclosed in the related applications of the inventor, U.S. Ser. No. 08/806,087 (1997) nou U.S. Pat. No. 5,876,839, and U.S. Pat. No. 5,453,155 (1995), are incorporated herein for reference.

A conventional process for preparing a transfer-printing sheet or sticker is illustrated in FIG. 1. A cross-section of a conventional transfer-printing sheet or sticker (10) prepared thereby is shown in FIG. 2. The transfer-printing sheet or sticker (10) comprises a substrate (12) having a binder (14) on one surface thereof, a transparent polyester (PET) (16) disposed on said binder (14) thus forming a base for printing, a layer of ink (18) of a pattern and/or characters being printed on said PET layer (16), a second binder (20) applied onto said PET layer (16), and a transferring paper (22) being disposed on said second binder (20), wherein, before said second binder (20) is applied onto the PET layer (16) after printing, said PET layer (16) and said binder (14) are cut off along the outlines of the pattern and/or characters thereon with a cutting instrument, and then the edge portion of which has been cut off and uncovered by said ink (18) is separated from the others.

There is, however, a drawback of the conventional transfer-printing sheet or sticker (10). Since, after said ink (18) is printed onto said PET layer (16), said PET layer (16) must be cut along the outlines of the pattern and/or characters thereon with a cutting instrument before proceeding to the following steps, and irregular edges form at the boundary of the pattern and/or characters. Therefore, it is possible that, when transfer-print a pattern and/or characters to a receiver on which the surface is uneven, irregular wrinkles are generated on the printed pattern or characters, and thus the integrated appearance and beauty of the receiver deteriorate. That is, they adversely affect the visual effect.

Moreover, in order to precisely cut the printed pattern or characters off of said PET layer (16), the cutting instrument must be specifically designed and produced. The finer the printed pattern or characters, the more difficult the production of the cutting instruments. The size and replacement of the cutting instrument are also limited by mechanical automation. After cutting, the edge portion of the PET layer (16), which has no pattern and/or characters printed thereon, must be carefully peel off. Therefore, additional cost and time are inevitable with the conventional process. It is necessary to improve the conventional process in order to follow the trend of transfer-printing toward variety but limited quantities of products.

OBJECTS AND SUMMARY OF THE INVENTION

An object of the present invention is to provide a filmless sticker for transfer-printing an ink in a pattern and/or characters thereon to a receiver resulting in a more beautiful and reliable appearance. It is also an object of the present invention to provide a process for preparing the filmless sticker, with which the aforementioned drawback is eliminated and the integrated appearance of the transfer on the receiver is improved with low cost but high efficiency.

According to one aspect of the present invention, a filmless sticker for transfer-printing an ink pattern and/or characters thereon to a receiver is characterized in that said filmless sticker is composed of a releasing paper having a binder on one surface thereof, a soluble film disposed on said binder, and a layer of said ink in a pattern and/or characters printed onto said soluble film.

According to another aspect of the present invention, a process for preparing the above filmless sticker comprises the steps of (a) providing a releasing paper; (b) a layer of binder being coated onto one surface of said releasing paper; (c) a soluble film being disposed on said binder and thus forming a soluble base; (d) a layer of ink in a pattern and/or characters being formed on said soluble film by printing; (e) a certain organic solvent being applied to said layer of ink to dissolve said film and said binder which are not covered by said ink; and (f) drying the resultant structure.

BRIEF DESCRIPTION OF THE DRAWINGS

The present invention will be better understood and the above objects will become apparent when attention is given to the following description and read in conjunction with the appended drawings, wherein:

FIG. 4 shows a cross-section of a filmless sticker after step (d) and before step (e) in a process for preparing the same according to the present invention;

FIG. 5 shows a cross-section of a filmless sticker according to one of the preferred embodiments of the present invention;

DETAILED DESCRIPTION OF THE PREFERRED EMBODIMENTS OF THE INVENTION

Figure 1:
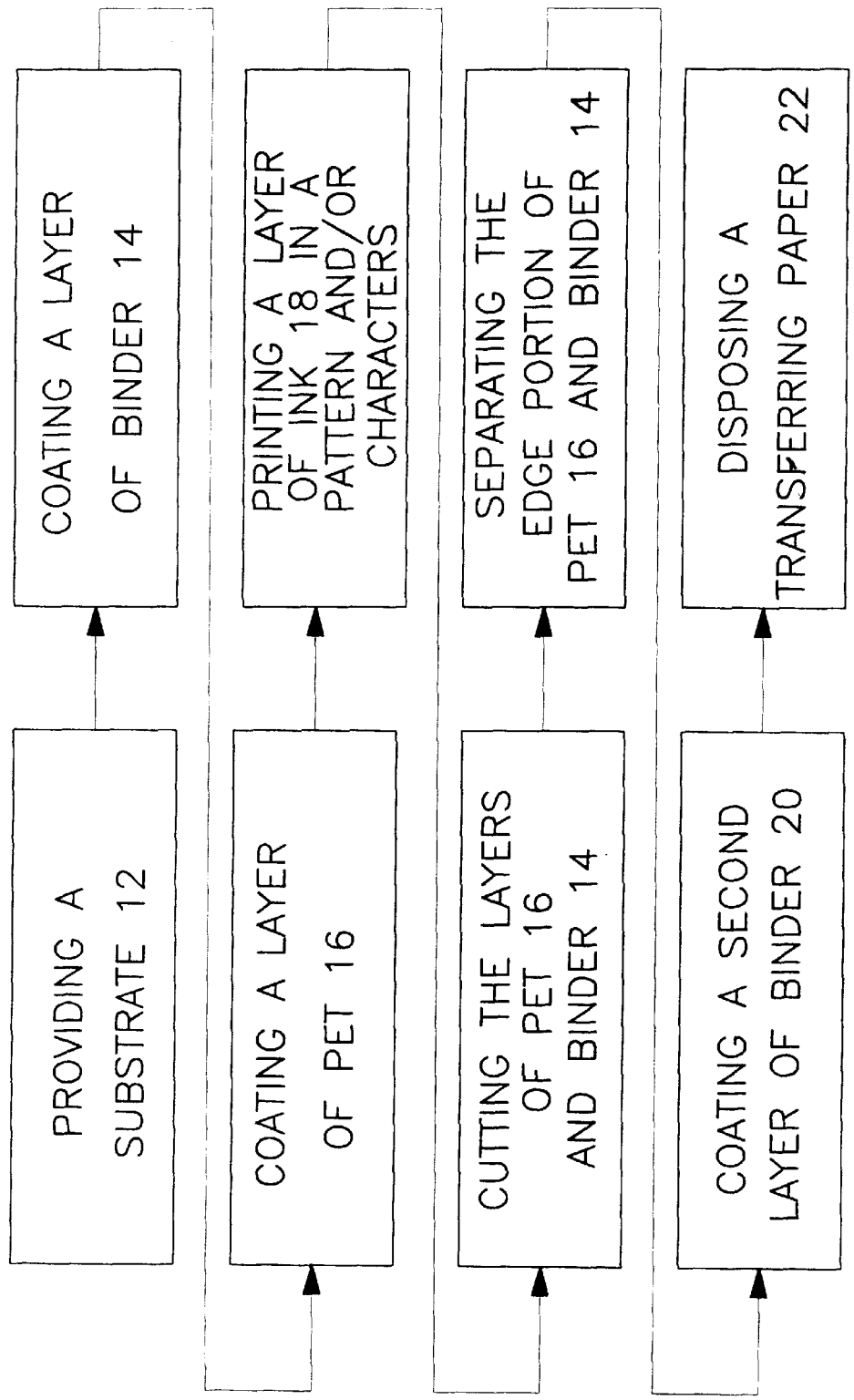
FIG. 1 is a flow diagram illustrating the conventional process for preparing a transfer-printing sheet or sticker.
Figure 2:
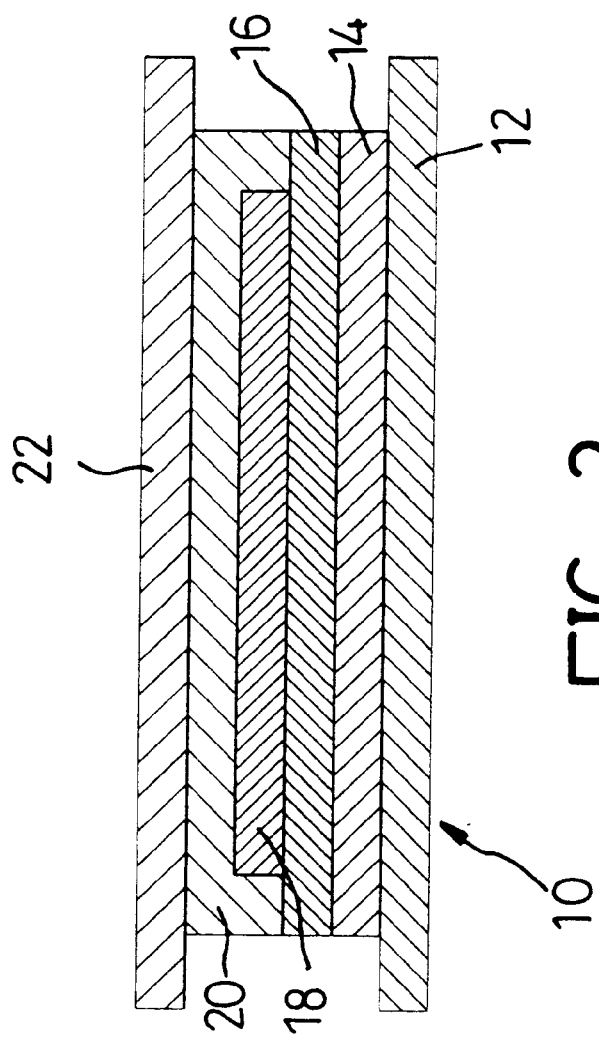
FIG. 2 shows a cross-section of a conventional transfer-printing sheet or sticker.
Figure 3:
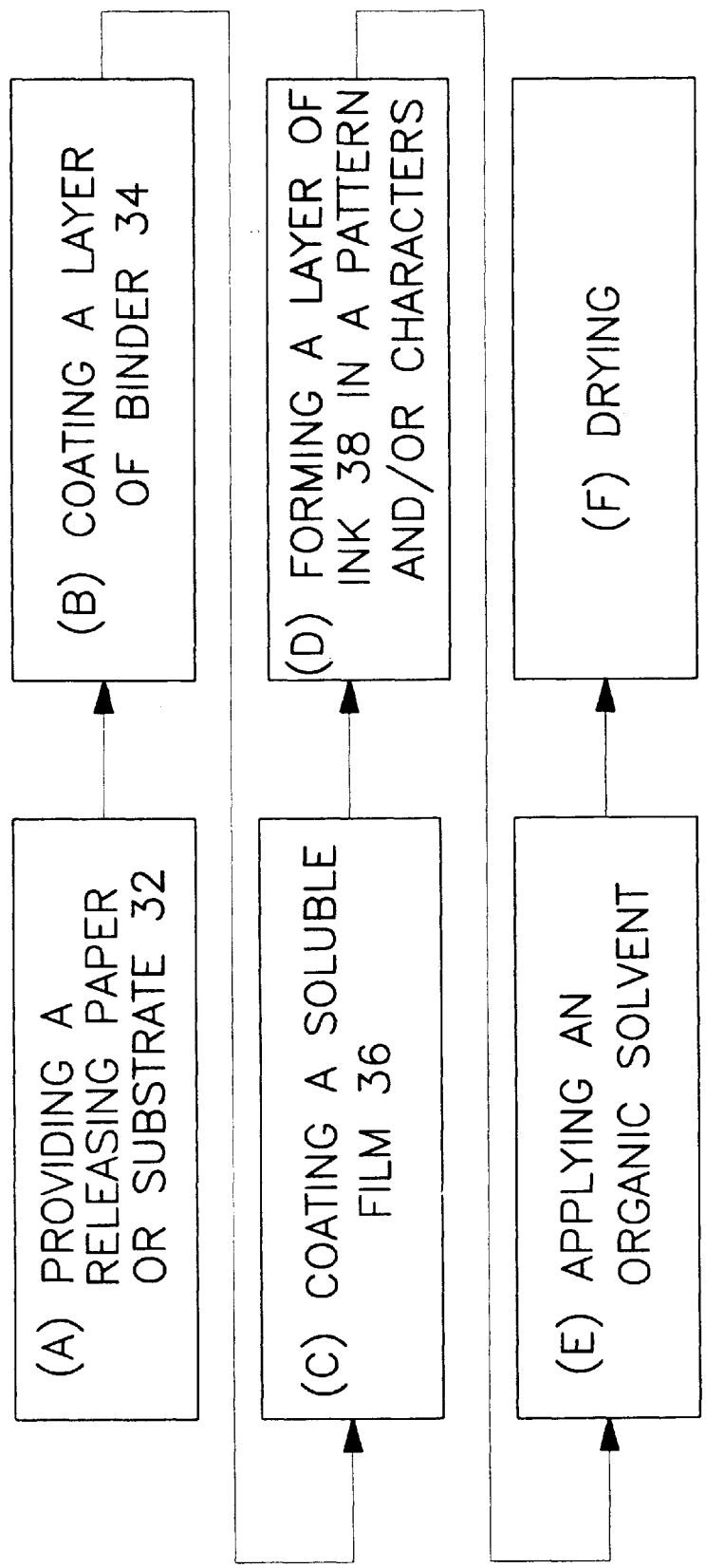
FIG. 3 is a flow diagram illustrating a process for preparing a filmless sticker according to the present invention.

According to the preferred embodiments of the present invention, a process for preparing a filminess sticker is illustrated in FIG. 3. A cross-section of a filmless sticker (30) prepared thereby is shown in FIG. 5.

Referring to FIG. 5, the filmless sticker (30) is composed of a releasing paper or substrate (32) having a binder (34) on one surface thereof, a soluble film (36) disposed on said binder (34), and a layer of a ink (38) in a pattern and/or characters printed onto said soluble film (36).

Said binder (34) is a pressure sensitive binder of, for example, acrylic or rubber with a thickness of 12 to 50 μm. It can be also dissolved by an organic solvent.

Said soluble film (36) can be acrylic resin, polyester resin, polyvinyl acetate resin, or vinyl chloride-vinyl acetate copolymer, which are amorphous. It has a thickness of 6 to 50 μm. As used here "soluble" means soluble in an organic solvent.

The releasing paper (32) sequentially coated with the binder (34) and the soluble film (36) forms a soluble base ready for printing.

Said ink (38) is solvent-resistant. For instance, it can be an ultraviolet ray curable ink (UV ink), an oxidation polymerization ink, or a two-component curable polyurethane ink (PU ink added with isocyanate). The term "solvent-resistant" herein means insoluble in an organic solvent. Alternatively, said ink may be soluble. In such a case, a transparent or water soluble ink of solvent-resistant type (not shown) will be additionally disposed on said soluble ink (38') to prevent said ink (38') from being dissolved by an organic solvent applied during the preparation process according to the present invention.

Referring to FIG. 3, the process for preparing said filmless sticker (30) comprises the steps of: (a) providing a releasing paper or substrate (32); (b) a layer of binder (34) being coated onto one surface of said releasing paper (32); (c) a soluble film (36) being disposed on said binder (34) and thus forming a soluble base; (d) a layer of ink (38) in a pattern and/or characters being formed on said soluble film by printing; (FIG. 4 shows the resultant structure.) (e) a certain organic solvent being applied to said layer of ink (38) to dissolve said film (36) and said binder (34) which are not covered by said ink (38); and (f) drying the resultant structure as shown in FIG. 5.

Step (d) in the above process can be carried out by screen printing, planographic printing, surface printing, or intaglio printing, all well known to those skilled in the art.

Said organic solvent applied in step (e) of the above process can be selected from the group consisting of ketones such as acetone, cyclohexanone and isophorone, esters such as glycol monoethyl ether acetate (cellosolve acetate, CAC), benzenes such as toluene and xylene, or the mixture thereof. Said organic solvent can be easily applied by man or by machine.

Figure 6:
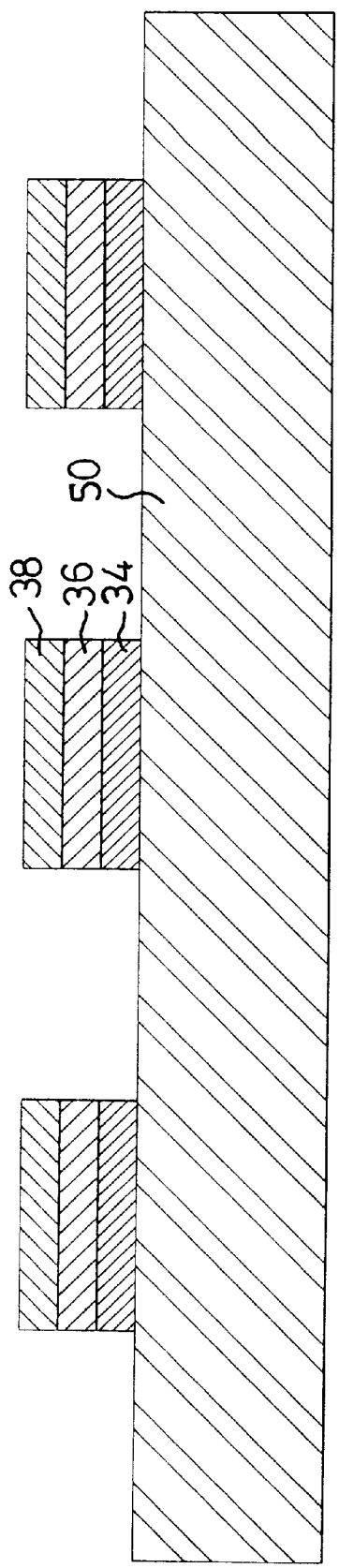
FIG. 6 shows a cross-section of a filmless sticker according to one of the preferred embodiments of the present invention after transfer-printing on a receiving article.
Figure 7:
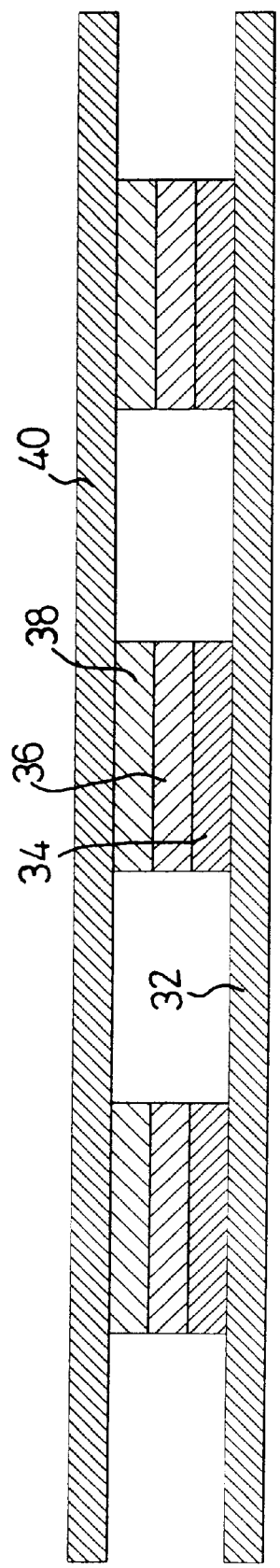
FIG. 7 shows a cross-section of a filmless sticker according to another one of the preferred embodiments of the present invention.

Just prior to the application of the filmless sticker (30) to a receiving article (50), the releasing paper (32) is separated from the filmless sticker (30). Then the soluble film (36) and the ink (38) are applied to the surface of the receiving article (50) by means of the binder (34), as shown in FIG. 6. Therefore, the pattern and/or characters formed by the ink (38) are transferred and firmly attached to the surface of the receiving article (50) so as to decorate it. Because the binder (34), the soluble film (36) and the ink (38) are of the same shape and size, only the pattern and/or characters formed by the ink (38) are visible on the receiving article (50). The other layers, the binder (34) and the soluble film (36), will not affect the integrity of the pattern and/or characters at all, regardless of whether the surface of the receiving article (50) is flat or not, owing to the complete coverage of the ink (38) by the aforementioned solvent-dissolving technique.

In accordance with one of the preferred embodiments of the present invention, the filmless sticker may further comprise a transferring paper (40) disposed on said layer of ink (38). To accomplish this, the process for preparing the filmless sticker, after step (f), may further comprise a step (g): a transferring paper (40) being disposed on said layer of ink (38). In such a case, the layer of ink (38), the soluble film (36), and the binder (34) will still remain on the transferring paper (40) after peeling off the releasing paper (32). After application of the filmless sticker (30) to the receiving article (50) by means of the binder (34), the transferring paper (40) is peeled off to complete the transfer-printing. The transferring paper (40) facilitates the separation of the releasing paper (32) especially when the pattern and/or characters formed by the ink (38) are so fine or complicated that they result in inconvenient separation of the releasing paper.

As described in the foregoing, according to the present invention, a filmless sticker for transfer-printing an ink in a pattern and/or characters thereon to a receiver and a process for preparing thereof have the following advantages.

The solvent-dissolving technique obviates the need for a cutting instrument in the preparation process to isolate the desired shape and size of the printed pattern and/or characters. Thus, there is no need to peel the edge portion of a layer of the filmless sticker off which has been cut off and uncovered by the ink. Consequently, it is possible to prevent the formation of the irregular wrinkles at the printed pattern or character edges on an uneven surface of a receiver. The integrated appearance and beauty of the receiver can thus be enhanced since the pattern and/or characters formed on the filmless sticker of the present invention can be finer and more complicated. In addition, foreign substances such as dust will not readily attach to the printed pattern and/or characters to deteriorate the appearance of the receiver because the binder is completely covered by the pattern and/or characters thereon. Accordingly, compared with the conventional process, the present invention improves both the sticker appearance and the preparation economy.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing a filmless sticker for transfer-printing in ink in a pattern and/or characters thereon to a receiver, characterized in that said filmless sticker is composed of a releasing paper having a binder on one surface thereof, a soluble film disposed on said binder, and a layer of said ink in a pattern and/or characters printed onto said soluble film, comprising the steps of:

(a) providing a releasing paper or substrate;

(b) a layer of binder being coated onto one surface of said releasing paper;

(c) a soluble film being disposed on said binder and thus forming a soluble base;

(d) a layer of ink in a pattern and/or characters being formed on said soluble film by screen printing, planographic printing, surface printing, or intaglio printing;

(e) an organic solvent being applied to said layer of ink to dissolve said film and said binder which are not covered by said ink, said organic solvent being selected from the group consisting of ketones, esters, benzenes, or the mixture thereof;

(f) drying the resultant structure; and (g) a transferring paper being disposed on said layer of ink.

2. The process according to claim 1, wherein said organic solvent used in step (e) is acetone, cyclohexanone, isophorone, glycol monoethyl ether acetate (cellosolve acetate, CAC), toluene, or xylene.

* * * * *